(12) United States Patent
Webb et al.

(10) Patent No.: US 10,844,760 B2
(45) Date of Patent: Nov. 24, 2020

(54) OIL HEATER FOR A GENERATOR SET

(71) Applicant: Cummins Power Generation IP, Inc., Minneapolis, MN (US)

(72) Inventors: Joshua Webb, Minneapolis, MN (US); John J. Martin, Vallonia, IN (US); Jie Luo, Fridley, MN (US); Charles D. Knealing, Andover, MN (US); Ramesh Timande, Columbus, IN (US); Ryan W. McKay, Columbus, IN (US)

(73) Assignee: Cumming Power Generation IP, Inc., Minneapolis, MN (US)

( * ) Notice: Subject to any disclaimer, the term of this patent is extended or adjusted under 35 U.S.C. 154(b) by 314 days.

(21) Appl. No.: 15/883,427

(22) Filed: Jan. 30, 2018

(65) Prior Publication Data

US 2019/0234258 A1    Aug. 1, 2019

(51) Int. Cl.
| | |
|---|---|
| *F01M 5/00* | (2006.01) |
| *F01M 5/02* | (2006.01) |
| *F01M 11/06* | (2006.01) |
| *F02N 19/04* | (2010.01) |
| *F02B 63/04* | (2006.01) |

(Continued)

(52) U.S. Cl.
CPC ............ *F01M 5/021* (2013.01); *F01M 5/001* (2013.01); *F01M 5/005* (2013.01); *F01M 11/0004* (2013.01); *F01M 11/061* (2013.01); *F02B 63/044* (2013.01); *F02B 63/047* (2013.01); *F02B 63/048* (2013.01); *F02N 19/04* (2013.01);

(Continued)

(58) Field of Classification Search
CPC ........ F01M 5/001; F01M 5/005; F01M 5/021; F01M 2005/023; F01M 2011/0029; F02B 63/044; F02B 63/047; F02B 63/048; F02N 19/04; F16N 2210/20
USPC .................................... 123/142.5 E, 196 AB
See application file for complete search history.

(56) References Cited

U.S. PATENT DOCUMENTS

| | | | | |
|---|---|---|---|---|
| 1,332,970 A | * | 3/1920 | Berres ..................... | F01M 5/021 184/104.2 |
| 1,395,949 A | * | 11/1921 | Eckman ................. | B01D 35/18 219/205 |

(Continued)

FOREIGN PATENT DOCUMENTS

| | | |
|---|---|---|
| DE | 21 15 221 A1 | 10/1972 |
| DE | 10042258 A1 | 3/2002 |

(Continued)

OTHER PUBLICATIONS

International Search Report and Written Opinion Received for Application No. PCT/US2019/015571, dated May 3, 2019, 16 pages.

*Primary Examiner* — Erick R Solis
(74) *Attorney, Agent, or Firm* — Foley & Lardner LLP (57) ABSTRACT

Systems and apparatuses include a generator set including an alternator, a transmission coupled to the alternator and structured to receive power from an engine, and an oil heating system including an oil pan structured to provide lubricating oil to the engine and including an oil outlet and an oil inlet, a plurality of immersion heaters positioned at least partially within the oil pan, a return line positioned within the oil pan, coupled to the oil inlet, and including a plurality of apertures for providing oil into the oil pan, each aperture aligned with a corresponding one of the plurality of immersion heaters, and a pump receiving oil from the oil outlet, and providing oil to the oil inlet.

22 Claims, 5 Drawing Sheets

(51) Int. Cl.
*F01M 11/00* (2006.01)
*F02D 29/06* (2006.01)

(52) U.S. Cl.
CPC ....... *F01M 2005/023* (2013.01); *F02D 29/06* (2013.01); *F16N 2210/20* (2013.01)

(56) References Cited

U.S. PATENT DOCUMENTS

| | | | |
|---|---|---|---|
| 2,470,972 A | 5/1949 | Boger | |
| 3,066,664 A | 12/1962 | McNew et al. | |
| 3,213,263 A * | 10/1965 | Steenbergen | H05B 3/06 219/205 |
| 3,953,707 A * | 4/1976 | Tanis | F01M 5/02 219/205 |
| 4,522,166 A * | 6/1985 | Toivio | B01D 35/18 123/196 A |
| 4,556,024 A | 12/1985 | King et al. | |
| 4,949,690 A * | 8/1990 | Maurente | F01M 5/021 123/142.5 E |
| 4,971,704 A * | 11/1990 | Johnson, Sr. | B01D 35/185 123/196 A |
| 5,159,910 A | 11/1992 | Ninomiya et al. | |
| 6,018,137 A * | 1/2000 | Reiff | F02N 19/02 123/142.5 E |
| 6,600,136 B1 | 7/2003 | Morris et al. | |
| 7,104,233 B2 * | 9/2006 | Ryczek | F01M 5/021 123/142.5 E |
| 7,267,084 B2 | 9/2007 | Lutze et al. | |
| 7,832,204 B2 | 11/2010 | Bidner et al. | |
| 8,944,023 B2 | 2/2015 | Neal et al. | |
| 9,127,663 B2 | 9/2015 | Pegg et al. | |
| 9,494,279 B2 * | 11/2016 | Antonakakis | H05B 3/0014 |
| 2013/0042825 A1 * | 2/2013 | Shimasaki | F01M 5/001 123/2 |
| 2014/0299084 A1 | 10/2014 | Adams et al. | |

FOREIGN PATENT DOCUMENTS

| | | | |
|---|---|---|---|
| EP | 0 861 368 B1 | 9/1998 | |
| FR | 790038 A | 11/1935 | |
| GB | 0 410 169 A | 5/1934 | |
| JP | S58-148213 A | 9/1983 | |
| JP | 2004270618 A * | 9/2004 | F16H 57/0404 |

* cited by examiner

OIL HEATER FOR A GENERATOR SET

TECHNICAL FIELD

The present disclosure relates to pre-heating oil for an engine. More particularly, the present disclosure relates to systems and methods for pre-heating oil in a sump or oil pan for an engine within a generator set.

BACKGROUND

Immersion heaters used in oil pans of generator sets have historically had problems heating oil without large temperature differentials. Large temperature differentials can lead to stratified thermal layers within the oil pan and can ultimately inhibit the colder oil in bottom portions of the oil pan for reaching a suitable temperature for use in the generator set. Additionally, immersion elements have suffered from coking or oil oxidation due to a lack of oil flow around the heating elements.

SUMMARY

One embodiment relates to a generator set including an alternator, a transmission coupled to the alternator and structured to receive power from an engine, and an oil heating system including an oil pan structured to provide lubricating oil to the engine and including an oil outlet and an oil inlet, a plurality of immersion heaters positioned at least partially within the oil pan, a return line positioned within the oil pan, coupled to the oil inlet, and including a plurality of apertures for providing oil into the oil pan, each aperture aligned with a corresponding one of the plurality of immersion heaters, and a pump receiving oil from the oil outlet, and providing oil to the oil inlet.

Another embodiment relates to an apparatus that includes an oil pan structured to provide lubricating oil to an engine of a generator set and including an oil outlet and an oil inlet, a plurality of immersion heaters positioned at least partially within the oil pan, a return line positioned within the oil pan, coupled to the oil inlet, and including a plurality of apertures for providing oil into the oil pan, each aperture aligned with a corresponding one of the plurality of immersion heaters, and a pump receiving oil from the oil outlet, and providing oil to the oil inlet.

Another embodiment relates to an apparatus that includes an oil pan structured to provide lubricating oil to an engine of a generator set, the oil pan including an oil outlet, a plurality of immersion heaters mounted to the oil pan so that each of the plurality of immersion heaters can be removed while engine components of the generator set are in place, a return line providing oil into the oil pan adjacent each of the plurality of immersion heaters, and a pump receiving oil from the oil outlet, and providing oil to the return line.

Another embodiment relates to a method that includes pumping oil from an oil pan of a generator set to a return line positioned within the oil pan, heating oil in the oil pan with a plurality of immersion heaters, providing oil from the return line to the oil pan through a plurality of apertures, each aperture positioned adjacent one of the plurality of immersion heaters.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for an oil heating system used with a generator set. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for pre-heating oil in the sump or oil pan of a generator set that includes an engine, a transmission, and generator components (e.g., an alternator). Three immersion heating elements are mounted in the oil pan and provide heat to the oil. A pump is positioned outside the oil pan and receives oil from the oil pan. A return line is positioned within the oil pan and receives a flow of oil from the pump. The return line includes three apertures, each aligned with one of the three immersion heating elements, and provides oil flow through the apertures to the immersion heating elements. The apertures are each individually sized to provide an equal oil flow rate at each aperture. The geometry of each aperture can also be tuned to improve the flow balance between apertures. The immersion heating elements are mounted in the oil pan in a way that allows access and removal of the immersion heating elements while the engine components, transmission components, and generator components are in place.

Figure 1:
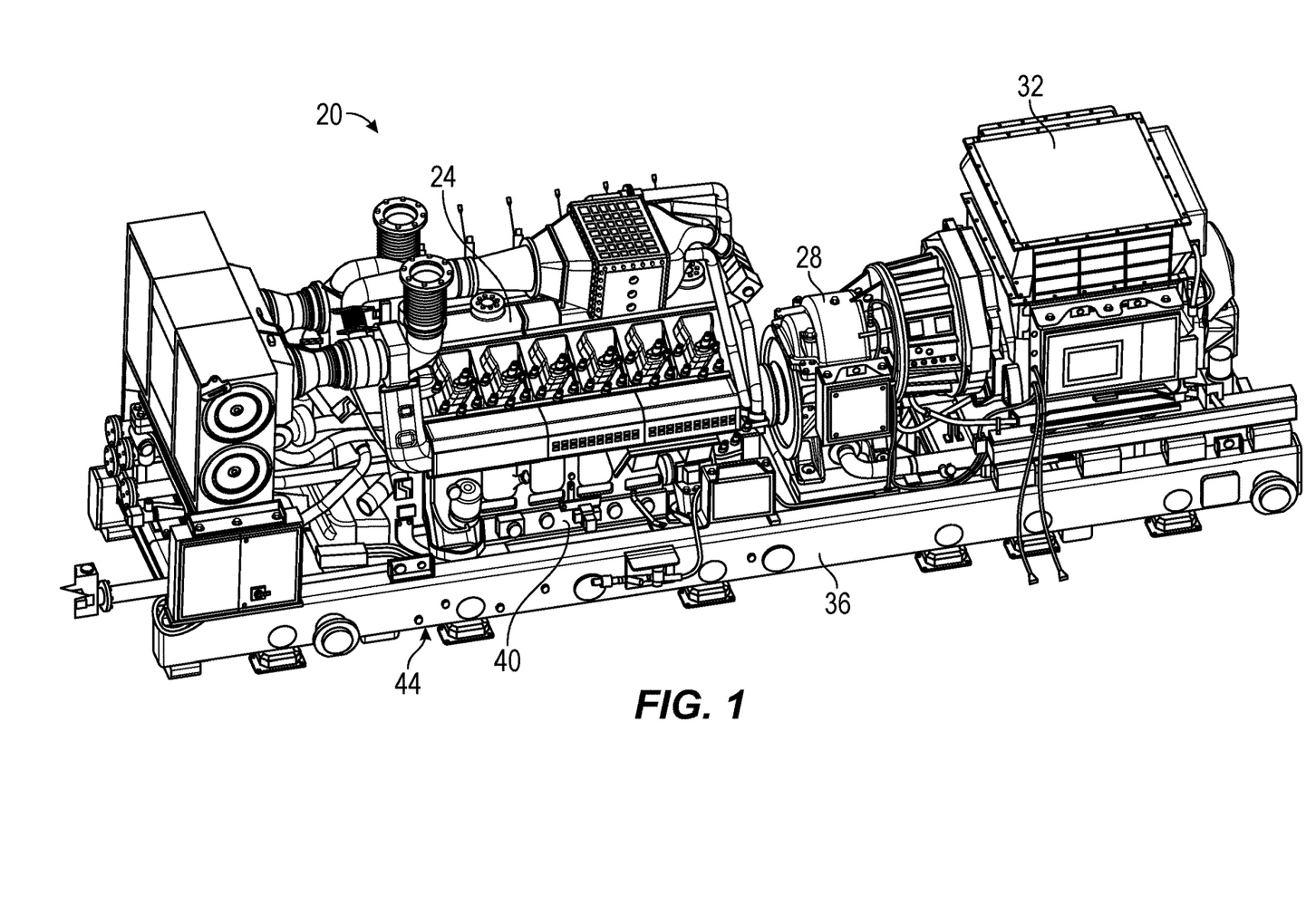
FIG. 1 is a perspective view of a generator set according to some embodiments.

As shown in FIG. 1, a generator set 20 includes an engine 24, a transmission 28, and a generator 32 mounted on a frame or chassis 36. In some embodiments, the engine 24 is a diesel engine and includes cylinders, pistons, a crankshaft, a fueling system, an air-handling system, and an exhaust. In some embodiments, the generator 32 includes an alternator and a voltage regulator. In some embodiments, the generator set 20 also includes an aftertreatment system.

The engine 24 also includes a sump or oil pan 40 arranged to hold lubricating oil for the engine 24. An oil heating system 44 is arranged to pre-heat the oil in the oil pan 40 to a desired temperature before starting the engine 24. The oil heating system 44 is arranged on a non-service side of the engine 24. That is to say, the commonly serviced components of the engine 24 are located on a side opposite the oil heating system. This positioning allows more access to the oil heating system 44 for maintenance. In some embodiments, it is desirable to heat the oil to fifty-five degrees Celsius (55° C.) before starting the engine. In some embodiments, it is desirable to perform oil pre-heating in less than four hours. In some embodiments, the oil heating system 44 is structured to pre-heat the oil from five degrees Celsius (5° C.) to fifty-five degrees Celsius (55° C.) in less than four hours.

Figure 2:
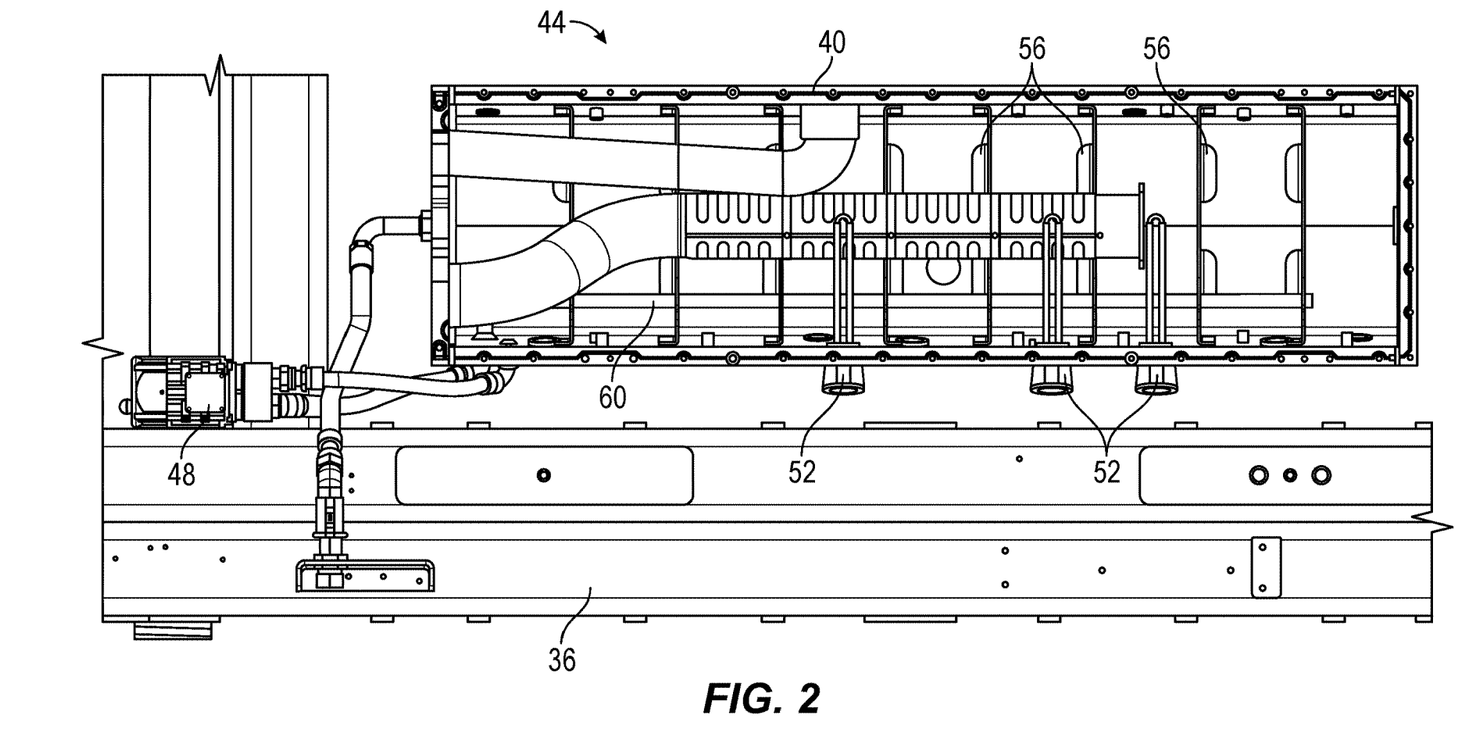
FIG. 2 is a top view of an oil heating system for the generator set of FIG. 1 according to some embodiments.

As shown in FIG. 2, the oil heating system 44 includes the oil pan 40 sized to hold the oil needed by the engine 24, a pump 48 mounted to the chassis 36 and arranged to pump oil, three immersion heating elements 52 arranged to heat the oil in the oil pan 40, eight baffles 56 in the oil pan 40 structured to provide rigidity and allow flow within the oil pan 40, and a return line 60 structured to receive a flow of oil from the pump 48 and distribute the flow of oil over the heating elements 52.

Figure 3:
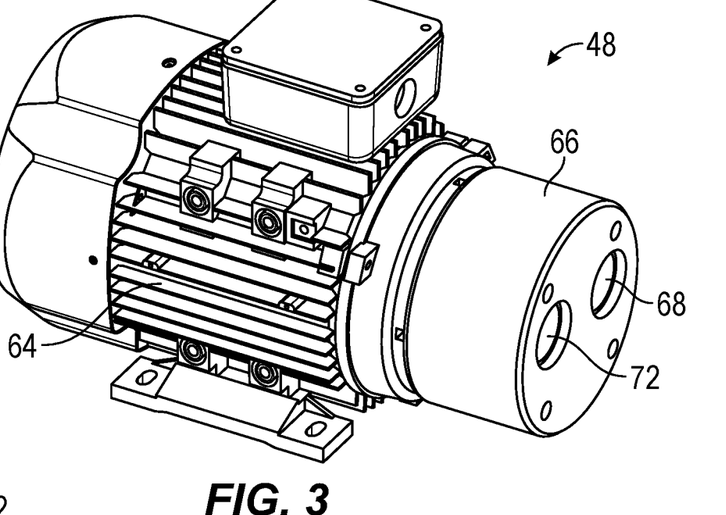
FIG. 3 is a perspective view of a pump of the oil heating system of FIG. 2 according to some embodiments.

As shown in FIG. 3, the pump 48 includes an electric motor 64 and a pump head 66 having a pump inlet 68 and a pump outlet 72. In some embodiments, the pump 48 provides 9 gallons per minute (9 gpm) of flow at one-hundred pounds per square inch of pressure (100 psi).

Figure 4:
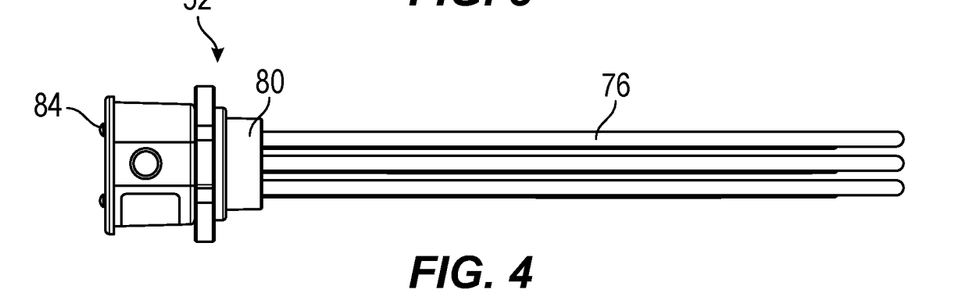
FIG. 4 is a side view of a heating element of the oil heating system of FIG. 2 according to some embodiments.

As shown in FIG. 4, each of the immersion heater elements 52 includes a resistive heater 76, a coupling portion in the form of a male threaded nipple 80, and an electrical connection 84. In some embodiments, the immersion heater element 52 is a low watt density or an ultra-low watt density heating element. In some embodiments, the selection of a low watt density or an ultra-low watt density heating element increases the lifespan of the immersion heating element 52 and reduces the effects of oil coking and/or oxidation. In some embodiments, the immersion heater element 52 has an operating power of 1.4 kW, a length of the resistive heater 76 is eighteen inches (18 in), and defines a watt density of ten watts per square inch (10 W/sq in). In some embodiments, the immersion heater element 52 has an operating power of two kilowatts (2 kW), a length of the resistive heater 76 is twelve inches (12 in), and defines a watt density of twenty-four watts per square inch (24 W/sq in).

Figure 5:
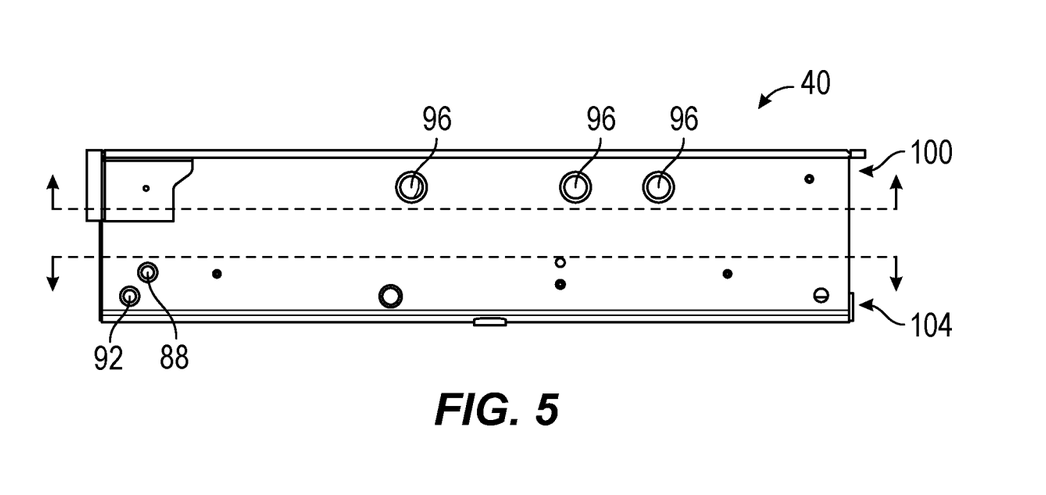
FIG. 5 is a side view of an oil pan of the oil heating system of FIG. 2 according to some embodiments.

As shown in FIG. 5, the oil pan 40 includes an oil outlet 88, an oil inlet 92, and three element bosses 96 sized to receive the male threaded nipples 80 of the immersion heating elements 52. In some embodiments, the element bosses 96 are M60 threaded apertures. The oil pan 40 defines a top portion 100 and a bottom portion 104. As used herein, the top portion 100 is defined as any portion of the oil pan 40 that is accessible while the engine 24, transmission 28, and generator 32 are in place on the chassis 36. In some embodiments, the top portion 100 is the upper half of the oil pan 40, the upper quarter of the oil pan 40 or on a top surface of the oil pan 40. In some embodiments, the bottom portion 104 is defined as any portion of the oil pan 40 below a natural convection line of oil heated by immersion heating elements (e.g., the immersion heating elements 52) without agitation. The natural convection line may be defined by a thermal differential threshold. In some embodiments, the bottom portion 104 is defined as the lower half or lower quarter of the oil pan 40.

Figure 6:
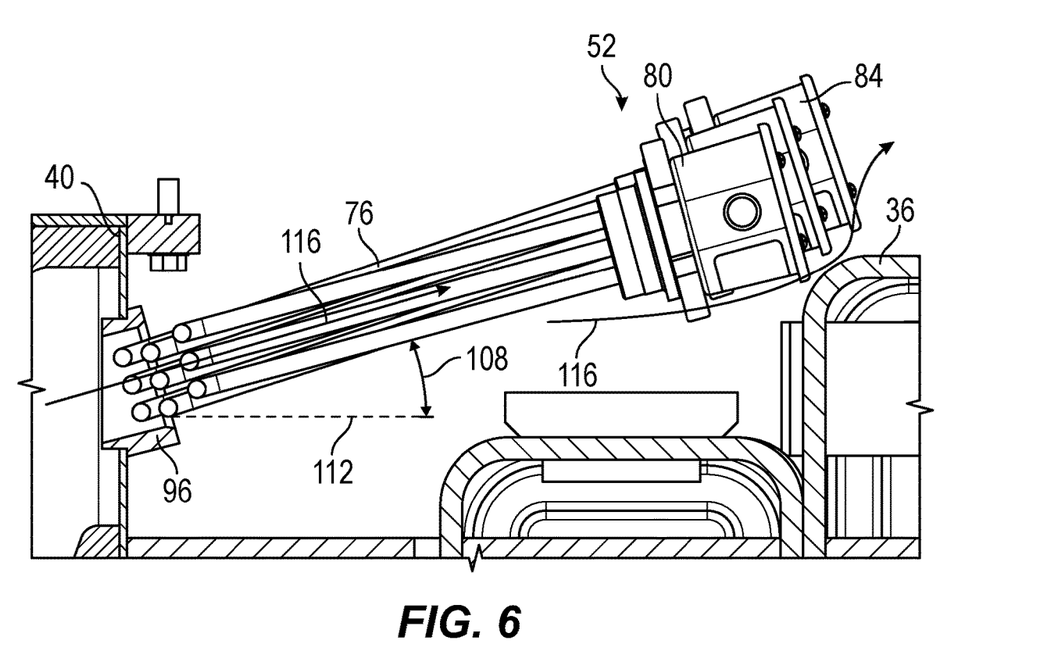
FIG. 6 is a perspective view of a baffle of the oil heating system of FIG. 2 according to some embodiments.

As shown in FIG. 6, the element bosses 96 are arranged at an oblique angle 108 relative to a horizontal plane 112 of the oil pan 40. In some embodiments, the oblique angle 108 is sixteen degrees (16°). In some embodiments, the oblique angle 108 is between ten degrees (10°) and twenty degrees (20°). The oblique angle 108 provides improved or increased oil submersion of the immersion heating elements 52 and aids in the removal of the immersion heating elements 52 past the chassis 36. In some embodiments, the element bosses 96 are female threaded bosses with a thread pattern matching the male threaded nipple 80 of the immersion heating elements 52 (e.g., an M60 thread pattern). In some embodiments, the oblique angle 108 is selected to allow removal of the immersion heating elements 52 past the chassis 36 and other components of the generator set 20. As shown by the arrows 116, the immersion heating elements 52 are first removed straight out of the element bosses 96, then angled upward to complete removal. The ability to remove and replace the immersion heating elements 52 without disturbing other components of the generator set 20 significantly reduces maintenance costs.

Figure 7:
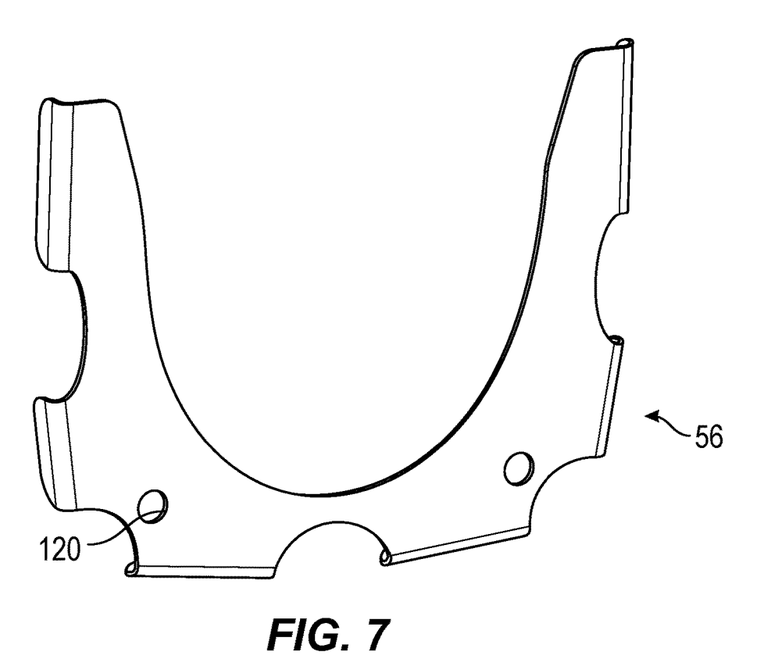
FIG. 7 is a partially exploded front view of the oil pan and the heating elements of the oil heating system of FIG. 2 according to some embodiments.

As shown in FIG. 7, each of the baffles 56 includes a return aperture 120 sized to receive the return line 60. Each of the baffles 56 also defines features for supporting and/or accommodating other components of the engine 24 that utilize the oil pan 40. In some embodiments, the baffles 56 are eliminated or build into the oil pan 40.

Figure 8:
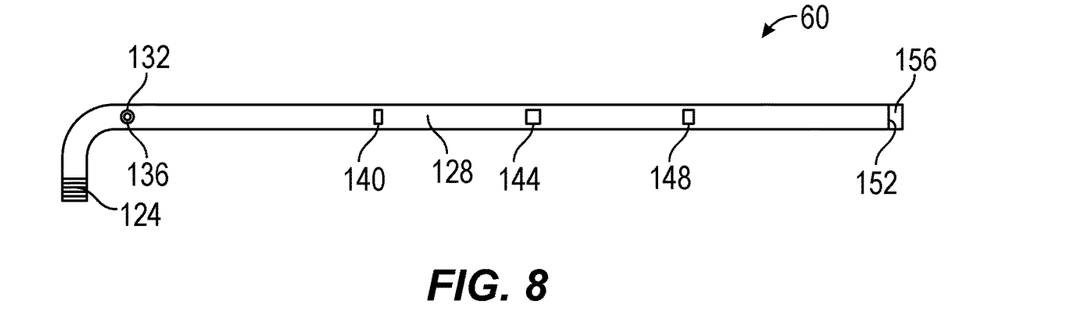
FIG. 8 is a top view of a return line of the oil heating system of FIG. 2 according to some embodiments.

As shown in FIG. 8, the return line 60 includes a return line coupler 124 structured to sealingly engage the oil inlet 92. In some embodiments, the return line coupler 124 is a welded connection. In some embodiments, the return line coupler 124 is a threaded connection. The return line 60 also includes a distribution tube 128 coupled to the return line coupler 124. In some embodiments, the return line coupler 124 includes an elbow portion and the distribution tube 128 is threadingly engaged with the return line coupler 124. In some embodiments, the distribution tube 128 is welded to the return line coupler 124. In some embodiments, the return line coupler 124 and the distribution tube 128 are integrally formed.

The distribution tube 128 defines a first access aperture 132 adjacent the return line coupler 124 that is plugged with a first plug 136, a first element aperture 140 positioned to provide a first flow of oil to a first of the immersion heating elements 52, a second element aperture 144 positioned to provide a second flow of oil to a second of the immersion heating elements 52, a third element aperture 148 positioned to provide a third flow of oil to a third of the immersion heating elements 52, and a second access aperture 152 positioned at an end distal from the first access aperture 132 that is plugged with a second plug 156. The first access aperture 132 and the second access aperture 152 can be used for maintenance and/or cleaning purposes. In some embodiments, the first access aperture 132 and the second access aperture 152 are eliminated. In some embodiments, the flow rate of oil through each of the apertures 140, 144, 148 is about three gallons per minute (3 gpm). In some embodiments, the flow rate of oil through each of the apertures 140, 144, 148 is between about three gallons per minute (3 gpm) and eight gallons per minute (8 gpm).

Figure 9:
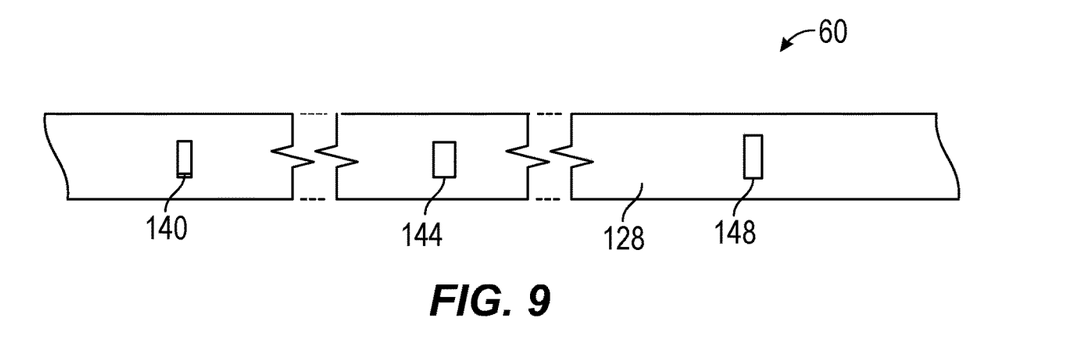
FIG. 9 is a detail view of apertures of the return line of FIG. 8 according to some embodiments.

As shown in FIG. 9, each of the first element aperture 140, the second element aperture 144, and the third element aperture 148 are individually sized and shaped geometrically to provide an equal flow rate out of each aperture 140, 144, 148. The open area and geometric shape of each aperture 140, 144, 148 can be selected using finite element analysis or other suitable flow design tools to achieve equal flow rates. In some embodiments, the aperture 140, 144, 148 define a rectangular shape. In some embodiments, each aperture 140, 144, 148 is sized to provide a three gallon per minute (3 gpm) flow rate to each of the immersion heating elements 52. In some embodiments, less than three or more than three immersion heating elements 52 are included in the oil heating system 44 and the corresponding components are altered to match the number of immersion heating elements 52 (e.g., the number and spacing of apertures in the return line 60). In some embodiments, each aperture 140, 144, 148 is aligned with the corresponding immersion elements 52. In some embodiments, the term "aligned" is defined as directly below or above so than a flow perpendicular to the distribution tube 128 is provided to each immersion element 52. In some embodiments, the term "aligned" is defined as any orientation (e.g., oblique, normal) that provides a flow of oil directed toward a corresponding immersion element 52.

In operation and with reference to FIG. 2, to cold start the engine 24, the oil in the oil pan 40 is first pre-heated using the oil heating system 44. The pump 48, sucks oil from the oil outlet 88 of the oil pan 40 into the pump inlet 68 of the pump head 66, and moves the oil under pressure out of the pump outlet 72 and to the oil inlet 92. The return line 60 then routes the oil out of the aperture 140, 144, 148 so that a flow of oil passes directly over the immersion heating elements 52. The immersion heating elements 52 receive electrical power from the generator set 20 and provide heat into the oil. As the oil circulates through the oil heating system 44, the temperature of the oil rises. In some embodiments, the oil heating system 44 is capable of heating one-hundred-forty gallons (140 g) of SAE 40 WT oil from about five degrees Celsius (5° C.) to about one-hundred-fifty-five degrees Celsius (155° C.) in about three and one half hours (3.5 hr). In some embodiments, a temperature differential between the top portion 100 and the bottom portion 104 of the oil pan 40 is about three degree Celsius (3° C.). In some embodiments, during heating the maximum temperature differential between the top portion 100 and the bottom portion 104 of the oil pan 40 is about thirty-eight degrees Celsius (38° C.).

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A generator set comprising:
   an alternator; and
   an oil heating system including
      an oil pan structured to provide lubricating oil to an engine and including an oil outlet and an oil inlet,
      an immersion heater positioned at least partially within the oil pan,
      a return line positioned within the oil pan, coupled to the oil inlet, and including an aperture for providing oil into the oil pan and aligned with the immersion heater, and
      a pump receiving oil from the oil outlet, and providing oil to the oil inlet.

2. The generator set of claim 1, wherein the immersion heater is installed in a top portion of the oil pan and the oil outlet is positioned in a bottom portion of the oil pan.

3. The generator set of claim 1, wherein the immersion heater is removable from the oil pan while all engine components of the generator set are in place.

4. The generator set of claim 1, further comprising a plurality of immersion heaters, wherein the return line includes a plurality of apertures, each of the plurality of apertures aligned with a corresponding one of the plurality of immersion heaters and individually sized so that an equal flow is provided through each aperture.

5. The generator set of claim 1, wherein the immersion heater is arranged at an oblique angle with respect to a horizontal plane of the oil pan.

6. An apparatus for pre-heating lubricating oil in an engine, comprising:
   an oil pan including an oil outlet and an oil inlet;
   a plurality of immersion heaters positioned at least partially within the oil pan;
   a return line positioned within the oil pan, coupled to the oil inlet, and including a plurality of apertures for providing oil into the oil pan, each aperture aligned with a corresponding one of the plurality of immersion heaters; and
   a pump receiving oil from the oil outlet, and providing oil to the oil inlet.

7. The apparatus of claim 6, wherein the immersion heaters are installed in a top portion of the oil pan and the oil outlet is positioned in a bottom portion of the oil pan.

8. The apparatus of claim 6, wherein the immersion heaters are removable from the oil pan while all engine components are in place.

9. The apparatus of claim 6, wherein each of the plurality of apertures is individually sized so that an equal flow is provided through each aperture.

10. The apparatus of claim 6, wherein the immersion heaters are arranged at an oblique angle with respect to a horizontal plane of the oil pan.

11. An apparatus, comprising:
   an oil pan structured to provide lubricating oil to an engine of a generator set, the oil pan including an oil outlet;
   a plurality of immersion heaters mounted to the oil pan so that each of the plurality of immersion heaters can be removed while engine components of the generator set are in place;
   a return line providing oil into the oil pan adjacent each of the plurality of immersion heaters; and
   a pump receiving oil from the oil outlet, and providing oil to the return line.

12. The apparatus of claim 11, wherein the oil pan defines a top portion and the plurality of immersion heaters are mounted in the top portion.

13. The apparatus of claim 11, wherein the return line is positioned within the oil pan.

14. The apparatus of claim 11, wherein the return line defines a plurality of apertures, each aperture adjacent one of the plurality of immersion heaters.

15. The apparatus of claim 14, wherein each of the plurality of apertures is individually sized so that an equal flow is provided through each aperture.

16. The apparatus of claim 11, further comprising a pump inlet fluidly coupling the oil outlet and the pump, and a pump outlet fluidly coupling the pump and the return line.

17. A method, comprising:
   pumping oil from an oil pan of a generator set to a return line positioned within the oil pan;
   heating oil in the oil pan with a plurality of immersion heaters;
   providing oil from the return line to the oil pan through a plurality of apertures, each aperture positioned adjacent one of the plurality of immersion heaters.

18. The method of claim 17, wherein pumping oil from the oil pan to the return line includes receiving oil from an oil pan outlet arranged in a bottom portion of the oil pan.

19. The method of claim 17, further comprising raising the temperature of the oil from five degrees Celsius (5° C.) to fifty-five degrees Celsius (55° C.) in under four hours.

20. The method of claim 17, wherein providing oil from the return line to the oil pan through the plurality of apertures includes providing an equal flow rate through each of the plurality of apertures.

21. The method of claim 17, further comprising mounting the immersion heaters to the oil pan using removable mounting devices to provide removability while engine components of the generator set are in place.

22. The method of claim 17, wherein pumping oil from the oil pan to the return line and providing oil from the return line to the oil pan through the plurality of apertures includes mixing the oil between a top portion of the oil pan and a bottom portion of the oil pan to reduce a temperature differential within the oil pan.

* * * * *

UNITED STATES PATENT AND TRADEMARK OFFICE
CERTIFICATE OF CORRECTION

PATENT NO. : 10,844,760 B2  
APPLICATION NO. : 15/883427  
DATED : November 24, 2020  
INVENTOR(S) : Joshua Webb et al.

Page 1 of 1

It is certified that error appears in the above-identified patent and that said Letters Patent is hereby corrected as shown below:

On the Title Page

Item (73), please correct the name of the Assignee to read:  
--Cummins Power Generation IP, Inc.--

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*